United States Patent [19]

Carter et al.

[11] Patent Number: 4,996,918
[45] Date of Patent: Mar. 5, 1991

[54] SOLID WASTE COMPACTOR WITH MULTIPLE RECEPTACLES

[76] Inventors: Neil A. Carter, 2 Cholla Cir., Santa Fe, N. Mex. 87501; John A. Roth, Star Rte. Box 24, Placitas, N. Mex. 87403

[21] Appl. No.: 486,969

[22] Filed: Feb. 28, 1990

[51] Int. Cl.⁵ ........................ B30B 15/14; B30B 15/02
[52] U.S. Cl. ...................... 100/52; 100/221; 100/226; 100/229 A; 100/289; 425/358
[58] Field of Search ................ 100/221–224, 100/225, 226, 229 R, 229 A, 289, 53, 52, 241, 255, 295, 100; 425/357, 358

[56] References Cited

U.S. PATENT DOCUMENTS

| | | | |
|---|---|---|---|
| 500,660 | 7/1893 | Kisinger | 100/221 X |
| 737,427 | 8/1903 | Lemberg | 100/229 R X |
| 1,814,159 | 7/1931 | Housman | 425/358 |
| 2,904,098 | 9/1959 | Maitzen | 100/221 X |
| 3,438,321 | 4/1969 | Gladwin | 199/221 |
| 3,478,909 | 11/1969 | Charles | 100/221 X |
| 3,495,376 | 2/1970 | Lundgen | 100/221 X |
| 3,589,277 | 6/1971 | Gray et al. | 100/221 X |
| 3,685,438 | 8/1972 | Ziegler | 100/226 X |
| 3,808,967 | 5/1974 | Fair et al. | 100/221 |
| 3,863,561 | 2/1975 | Karls | 100/221 X |
| 4,113,125 | 9/1978 | Schiller | 220/1 T X |
| 4,241,652 | 12/1980 | Smedlung | 100/52 X |

FOREIGN PATENT DOCUMENTS 195610  6/1957  Austria ................ 100/226

*Primary Examiner*—Philip R. Coe
*Assistant Examiner*—Stephen F. Gerrity
*Attorney, Agent, or Firm*—William A. Eklund

[57] ABSTRACT

A solid waste compactor having multiple waste receptacles for separately receiving, temporarily holding and compacting separate classes of solid waste, for example paper, glass, aluminum cans and steel cans. A single screw-driven compaction ram compacts solid waste in the several receptacles. The compaction ram extends from a trolley which is movable in two orthogonal directions on orthogonal tracks positioned above the receptacles. A reversible compaction motor mounted on the trolley drives the compaction ram up and down. The receptacles are mounted on a slidable carriage for removal from the compactor.

17 Claims, 11 Drawing Sheets

SOLID WASTE COMPACTOR WITH MULTIPLE RECEPTACLES

TECHNICAL FIELD

The invention disclosed and claimed herein is generally related to apparatus for compacting trash, refuse or other solid waste. More particularly, the present invention is related to solid waste compactors for domestic and commercial use.

BACKGROUND ART

Trash compactors have become increasingly popular in recent years, in both domestic and commercial applications. However, the advent of recycling practices, and more particularly the advent of recycling practices directed to the separate collection and disposal of different kinds of solid waste, has made it apparent that previously available trash compactors are characterized by certain problems. For example, most of the previously known solid waste compactors, and virtually all of the compactors that are commercially available for domestic use, include only a single compaction receptacle. In such compactors different kinds of solid wastes, for example paper, glass, aluminum cans and steel cans, are mixed and compacted together. Although such compactors are acceptable where it is desired to discard different kinds of waste in mixed form, they are not conducive to the separate disposal and recycling of different categories of solid waste, for example paper, aluminum, glass and steel.

Several compactors having two or more waste receptacles have been proposed in the prior art, as described for example in some of the references cited below. However, the introduction of multiple waste receptacles in the prior art compactors results in new problems. For example, such compactors are typically large and unwieldy, and for this reason are generally unsuitable for domestic or light commercial use. Where a single compaction ram is employed with multiple waste receptacles, complex structures have been necessary to move the ram about on tracks or rails. The alternative, namely the use of multiple, independently actuated rams in the manners disclosed in the prior art, is also complex and costly. Moreover, in the prior art compactors having multiple waste receptacles, the particular structures associated with the use of multiple receptacles renders it difficult to readily discard waste into each of the several receptacles, and to remove the receptacles from the compactor assembly for emptying and disposal of the compacted waste.

As noted above, a number of solid waste compactors are disclosed in the prior art. For example, U.S. Pat. No. 737,427, issued Aug. 25, 1903 to Lemberg, discloses a machine for compressing detinned iron and steel scraps. The machine includes stationary plungers and corresponding boxes, which are raised upward hydraulically to compress scraps contained in the boxes.

U.S. Pat. No. 4,113,125, issued Sept. 12, 1978 to Schiller, discloses a refuse vehicle having multiple chambers for receiving different categories of refuse, with pressing plates in the chambers for compressing the refuse and for ejecting it from the vehicle.

U.S. Pat. No. 3,495,376, issued Nov. 29, 1970 to Lundgren, discloses a refuse collecting machine which includes multiple refuse-containing compartments and a compressing device which is movable over the compartments and which is pressed downwardly to compress refuse therein.

U.S. Pat. No. 3,685,438, issued Aug. 22, 1972 to Ziegler, discloses a refuse compactor for use with a portable refuse container.

U.S. Pat. No. 3,438,321, issued on April 15, 1969 to Gladwin, discloses a trash compressor having a single ram which is selectively positionable on a set of tracks over one of two receptacles.

U.S. Pat. No. 3,808,967, issued May 7, 1974 to Fair et al., discloses a two-station trash compactor having a single hydraulic ram which is movable on rails over a pair of trash containers.

U.S. Pat. No. 3,863,561, issued Feb. 4, 1975 to Karls, discloses a top-loading compactor having a bellows-covered, mechanical scissors-type ram assembly which is movable on rails over a pair of trash containers.

U.S. Pat. No. 4,463,669, issued Aug. 7, 1984 to Van Doorn et al., discloses a a system having multiple receiving bins for receiving textile waste, and a transfer mechanism for selectively moving each bin back and forth between a filling station and a compression station.

In view of the foregoing, it is the object and purpose of the present invention to provide a solid waste compactor which is capable of separately receiving, temporarily holding, and compacting multiple classes of trash, refuse or other solid waste, particularly including recyclable solid waste.

It is also an object and purpose of the present invention to provide a solid waste compactor which attains the foregoing objects and purposes in a compact apparatus suitable for domestic as well as commercial use.

It is another object and purpose of the present invention to provide a solid waste compactor which attains the foregoing objects and purposes, and which also includes means facilitating the introduction of solid waste into each of multiple solid waste receptacles, and which also includes means facilitating the removal of such receptacles from the compactor for emptying.

DISCLOSURE OF INVENTION

The foregoing objects and purposes are attained in the solid waste compactor of the present invention, which includes a housing containing a plurality of upwardly opening solid waste receptacles arranged in a rectilinear array. The compactor further includes compaction ram means operable to compact downwardly solid waste contained in the receptacles. The compaction ram means extends from a movable platform which is selectively movable in orthogonal directions on first and second orthogonal track means which are positioned above the waste receptacles. The compaction ram means is driven by an electric compaction motor mounted on the movable platform.

In the preferred embodiment the movable platform includes a wheeled trolley. The trolley preferably travels on a first pair of tracks which span the housing in a first direction and which are affixed at their opposite ends in a pair of first and second mounting plates. The mounting plates travel on a second pair of tracks which are affixed to the housing and which span the housing in a second direction, whereby the trolley is movable in first and second mutually orthogonal directions above the receptacles so as to be selectively positionable above each of the receptacles.

In the preferred embodiment, the receptacles are removably mounted on a slidable carriage, and the housing includes an opening adjacent the carriage, such that the carriage may be withdrawn through the opening in the housing to permit introduction of waste into the receptacles, and to also permit emptying of the receptacles. The compactor also preferably includes a set of elongate bearing rollers mounted on the floor of the housing beneath the carriage, which operate particularly to support the carriage during compaction of waste in the receptacles. A pair of cabinet slides may also be provided at the edges of the carriage to guide the carriage in and out of the housing.

The compaction ram means preferably comprises an upright, externally-threaded tubular compaction screw which has a compaction plate affixed to its lower end. In this embodiment the trolley includes upper and lower plates having aligned openings, in which a pair of upper and lower bushings, respectively, are located. The compaction screw passes through the bushings. The bushings include integral keys which are engaged in longitudinal keyways in the compaction screw to prevent rotation of the compaction screw. The compaction motor is coupled to the compaction screw by a drive chain and an internally threaded chain sprocket which encircles the compaction screw between the upper and lower bushings.

The compactor further preferably comprises first and second indexing motors for driving the trolley. The first indexing motor is affixed to one of the mounting plates, with the first indexing motor being coupled to a first rotatable drive screw that spans the housing in a first direction and which passes through a rotatable nut journalled in the trolley. The first drive screw is journalled at its opposite ends in bearings affixed to the first and second mounting plates, whereby rotation of the first drive screw in one direction or the other by the first indexing motor causes the trolley to travel back and forth in a first direction. The second indexing motor is mounted on the inside wall of the housing and is coupled to a second rotatable drive screw which spans the housing in the second direction, orthogonal to the first direction. The second drive screw is journalled at its opposite ends in bearings affixed to the opposite inside ends of the housing. The second drive screw passes through a rotatable nut journalled in one of the mounting plates, whereby rotation of said second drive screw in one direction or the other by the second indexing motor causes the mounting plates and the trolley to travel back and forth in the second direction along the second pair of tracks.

These and other aspects of the present invention will be more apparent upon consideration of the following detailed description of the best modes for carrying out the invention, when taken with the accompanying drawings.

BRIEF DESCRIPTION OF DRAWINGS

The accompanying drawings constitute a part of this specification, and are hereby incorporated by reference.

In the Drawings.

BEST MODE FOR CARRYING OUT THE INVENTION

Figure 1:
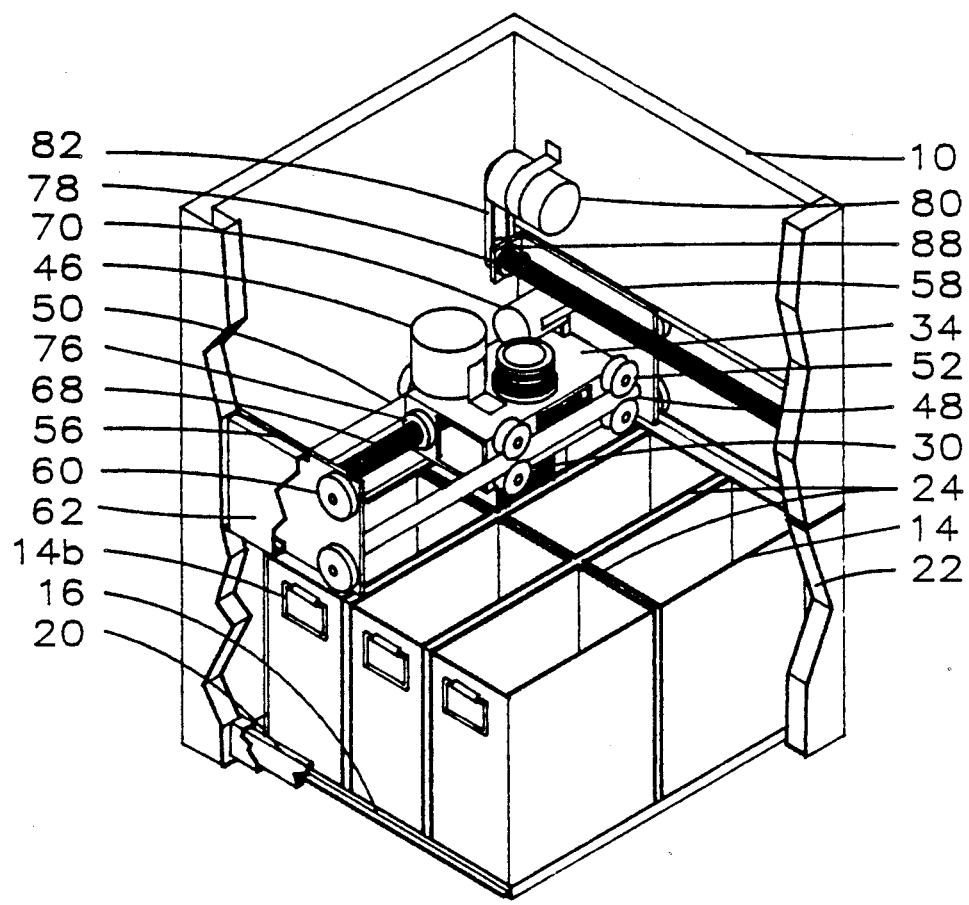
FIG. 1 is an isometric view, partially cut away, of a preferred embodiment of the solid waste compactor of the present invention.
Figure 2:
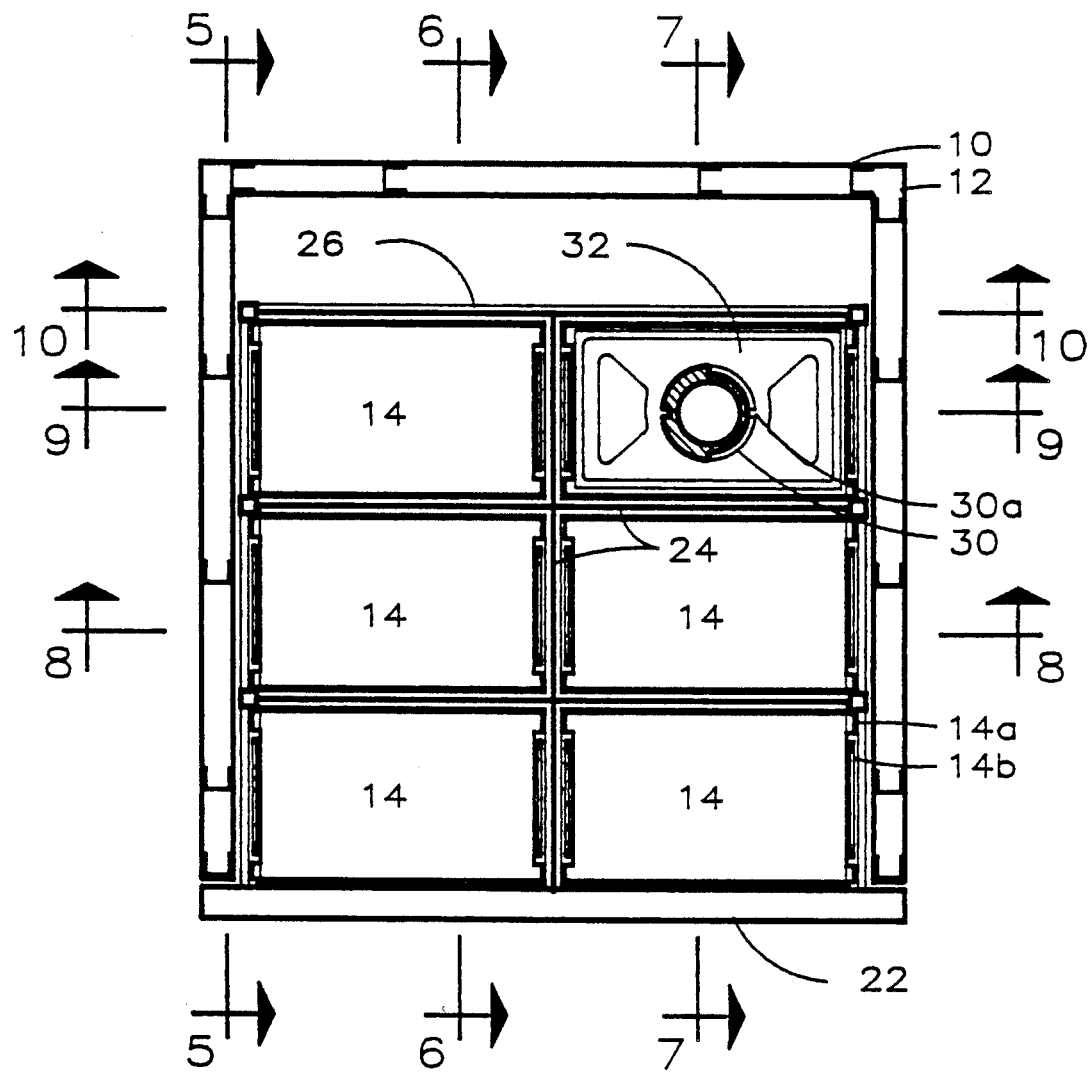
FIG. 2 is a plan view in cross section of the solid waste compactor of FIG. 1, taken along section line 2—2 of FIG. 5.
Figure 3:
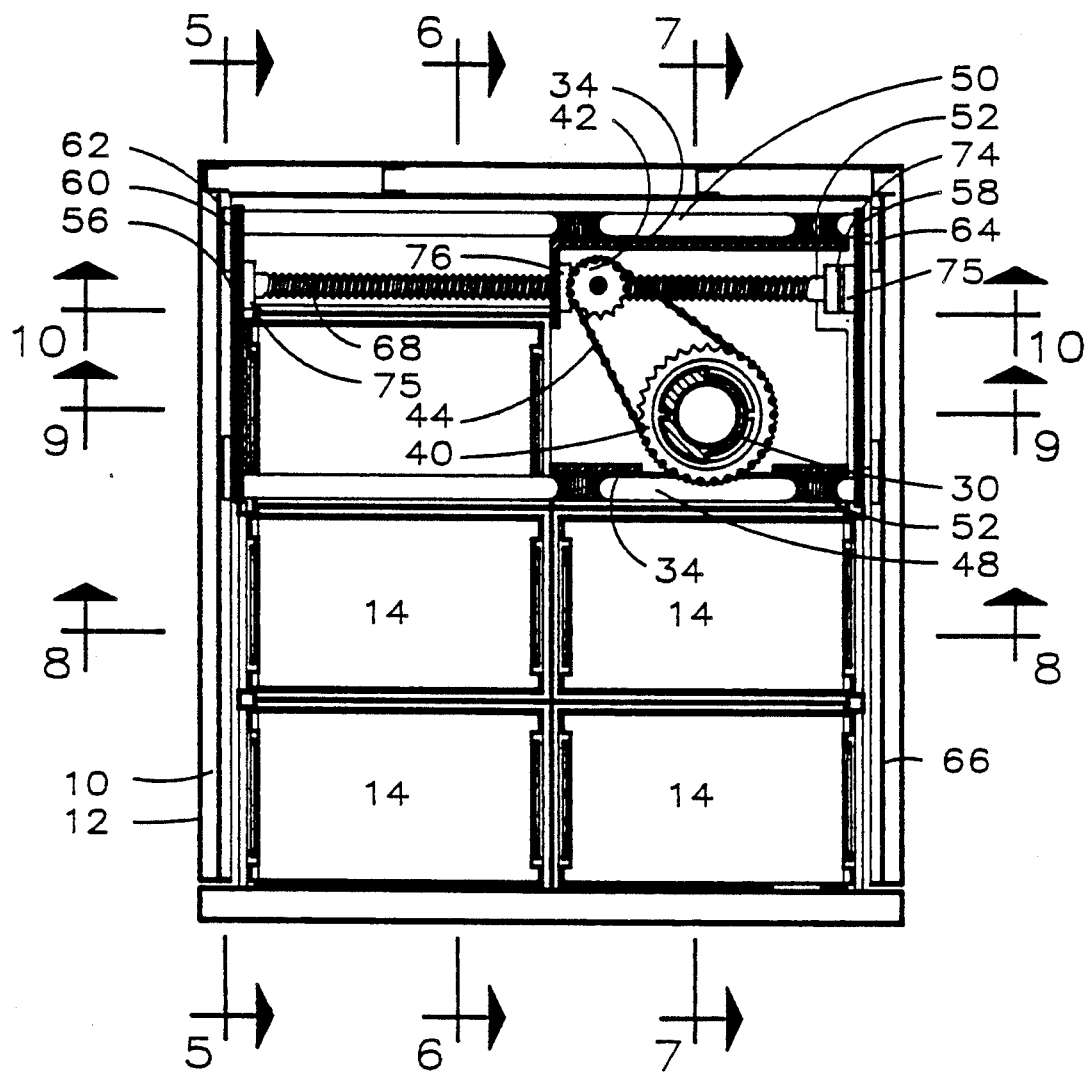
FIG. 3 is a plan view in cross section of the solid waste compactor of FIG. 1, taken along section line 3—3 of FIG. 5.

Referring to FIGS. 1 through 11, there is illustrated a solid waste compactor that constitutes a preferred embodiment and the best mode known to the inventors for carrying out the present invention.

The compactor includes a double-walled housing 10 which is internally reinforced with U-shaped channels 12. The housing 10 contains six substantially identical waste receptacles 14. The waste receptacles 14 are rectangular in configuration and open upwardly. Each receptacle 14 includes reinforced end walls 14a and foldable handles 14b which are hinged to the end walls 14a.

The receptacles 14 are removably mounted on a flat, double-walled, reinforced carriage 16. The carriage rests on two sets of elongate bearing rollers 18 which are positioned beneath the carriage 16. The opposite side edges of the carriage 16 are engaged in a pair of telescoping cabinet slides 20. The bearing rollers 18 operate to support the carriage 16 and the receptacles 14 while waste is being compacted in the receptacles 14, and also support the carriage 16 when it is withdrawn laterally. The cabinet slides 20 operate to guide the carriage 16 so that it can be withdrawn laterally from the housing 10 for emptying of the receptacles 14. The carriage 16 and receptacles are withdrawn from the housing 10 through an opening in the side of the housing 10, which is ordinarily covered by an access door 22 that is hinged to the housing.

The carriage 16 includes upright corrugated partitions 24 and a corrugated end panel 26 (FIG. 6), which operate to segregate and properly index the waste receptacles 14 on the carriage 16. The partitions 24 also provide limited lateral support to the walls of the receptacles 14 during waste compaction.

Compaction of waste in the receptacles 14 is effected by means of a single, large-diameter, upright compaction screw 30, and an associated rectangular compaction plate 32 which is affixed to the lower end of the compaction screw 30. The compaction screw may preferably be a large diameter, tubular, externally-threaded screw formed of a suitable polymeric material. The compaction plate 32 is shaped rectangularly and is sized to fit closely inside the receptacles 14. The plate 32 includes a flexible elastomeric wiper blade 32a, which extends laterally from the peripheral edge of the plate 32 and which engages the inside surfaces of the receptacles 14. The externally threaded compaction screw 30 includes two longitudinal keyways 30a extending along essentially its entire length.

Figure 11:
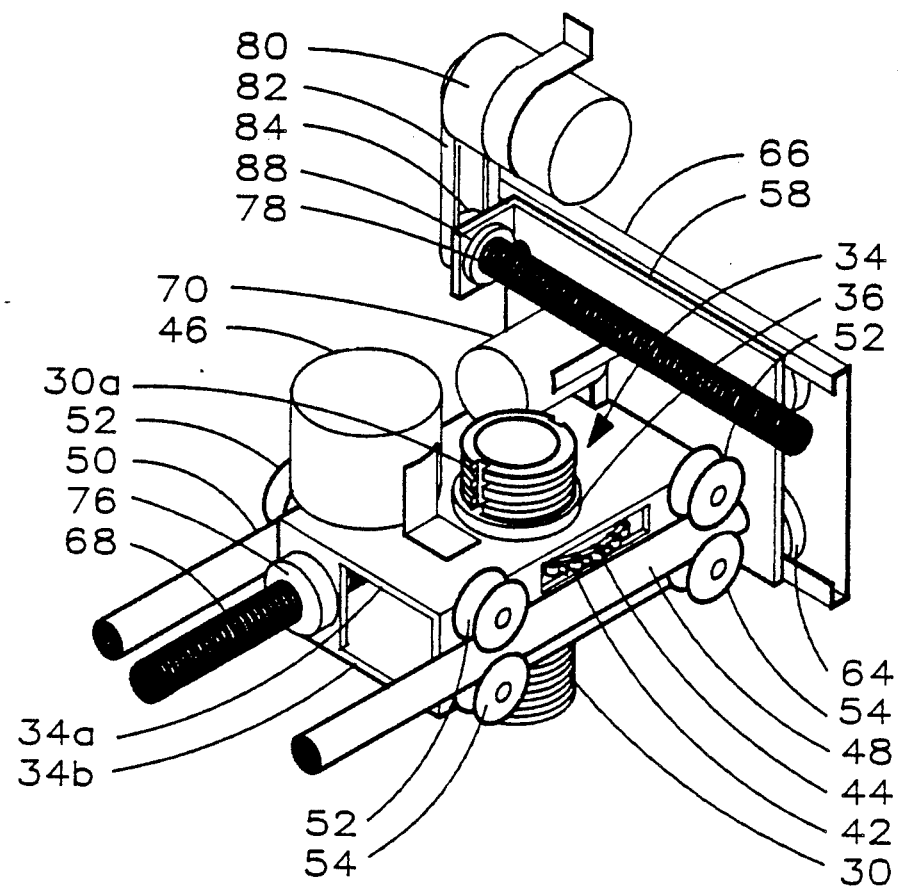
FIG. 11 is an enlarged isometric view of the trolley mechanism of the trash compactor.

The compaction screw 30 extends through, and is retained in, a box-shaped compaction screw trolley 34 (FIG. 11). As described further below, the trolley 34 is selectively movable in two orthogonal directions, designated the X-axis and the Y-axis respectively, so as to position the compaction screw 30 and plate 34 over any one of the six receptacles 14.

Figure 4:
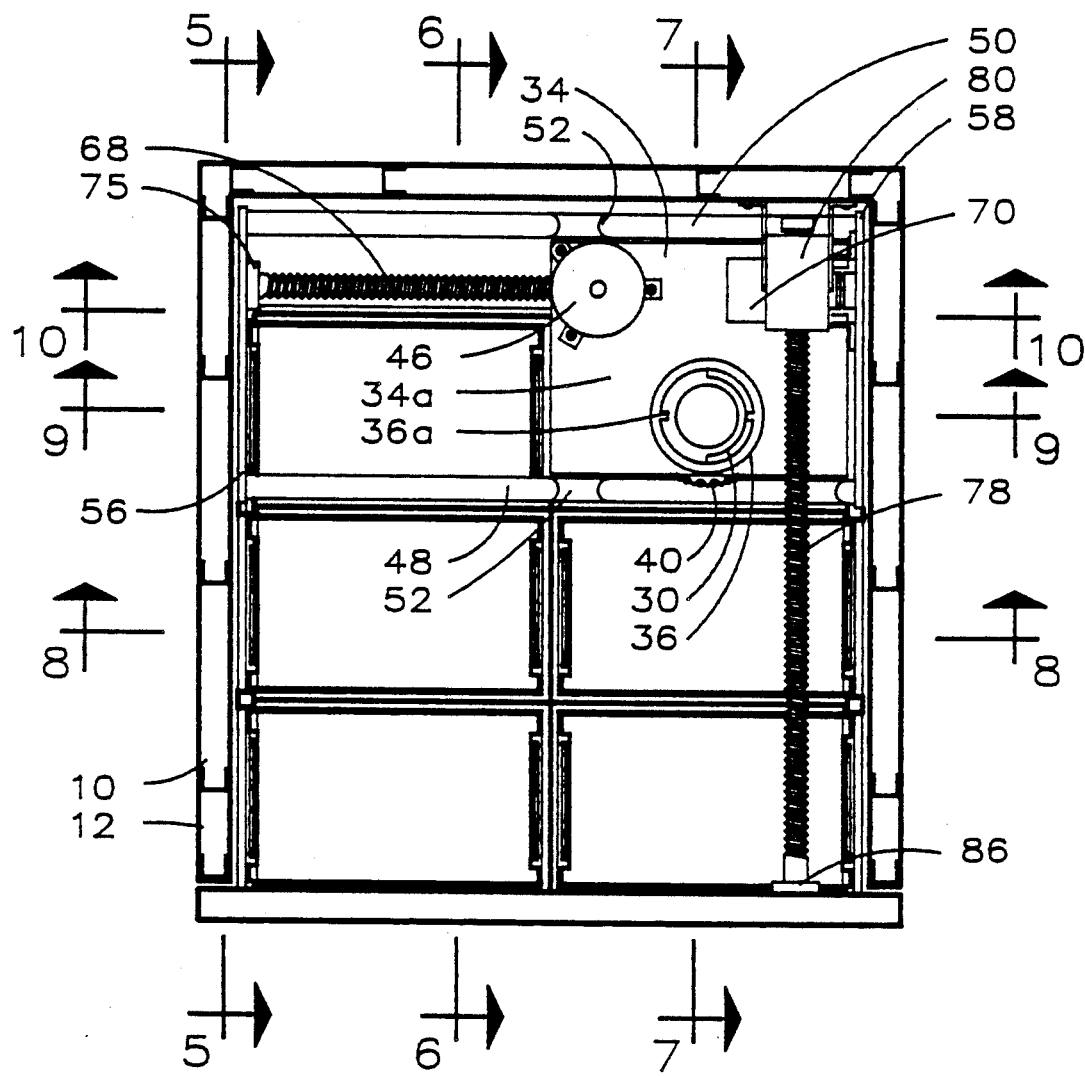
FIG. 4 is a plan view in cross section of the solid waste compactor of FIG. 1, taken along section line 4—4 of FIG. 5.
Figure 5:
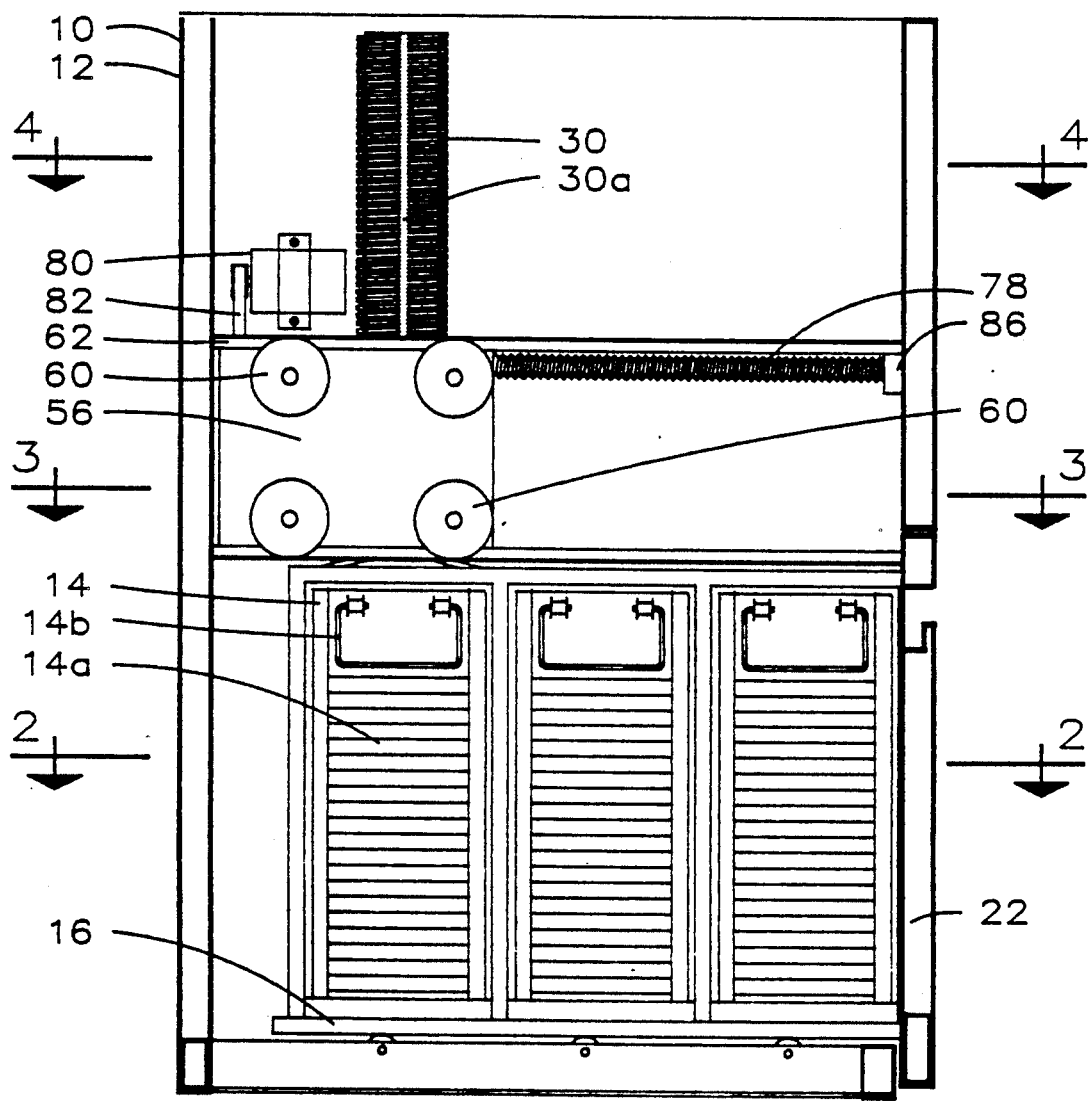
FIG. 5 is a side view in cross section of the solid waste compactor of FIG. 1, taken along section line 5—5 of FIG. 2.
Figure 6:
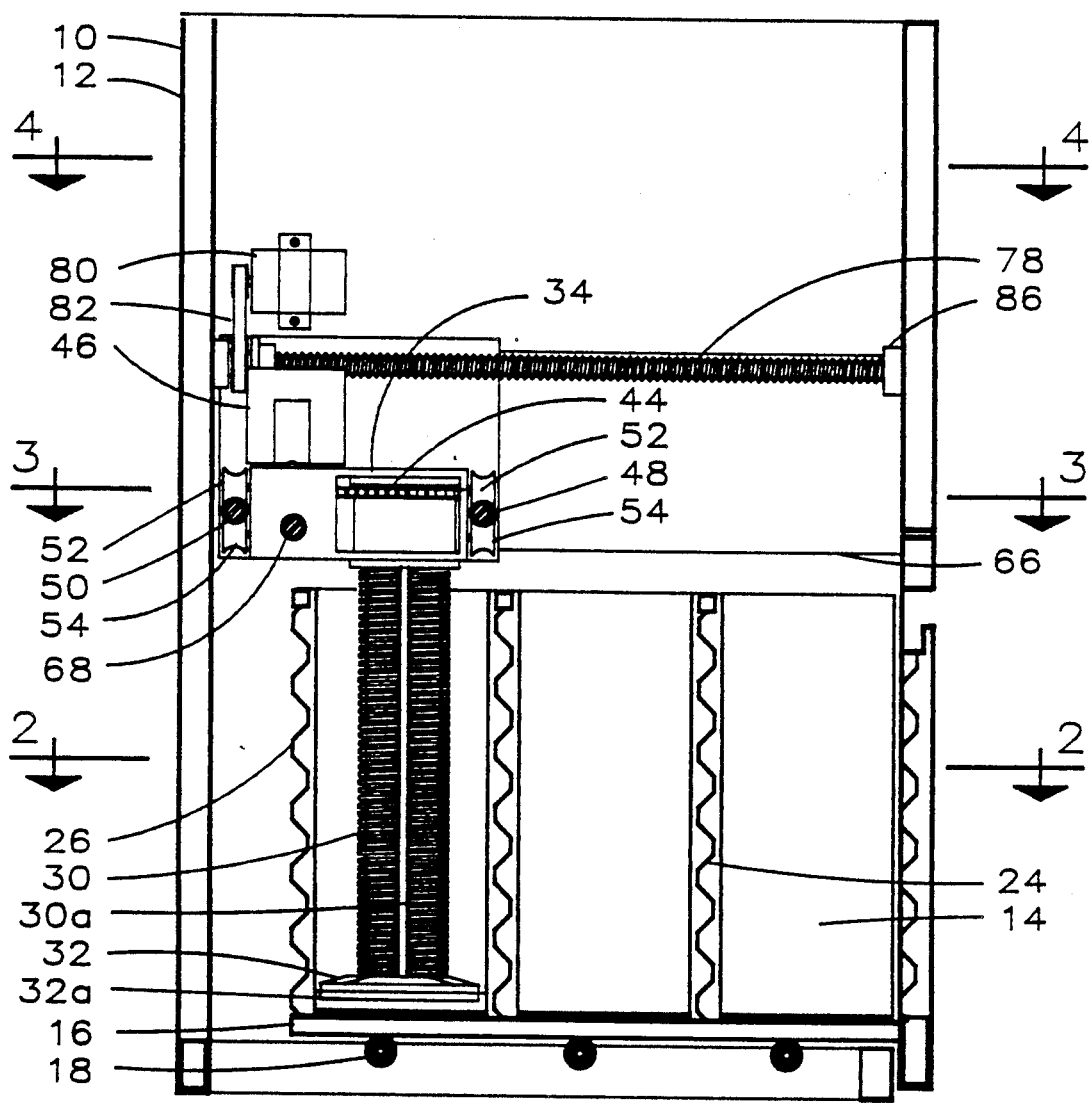
FIG. 6 is a side view in cross section of the solid waste compactor of FIG. 1, taken along section line 6—6 of FIG. 2.
Figure 7:
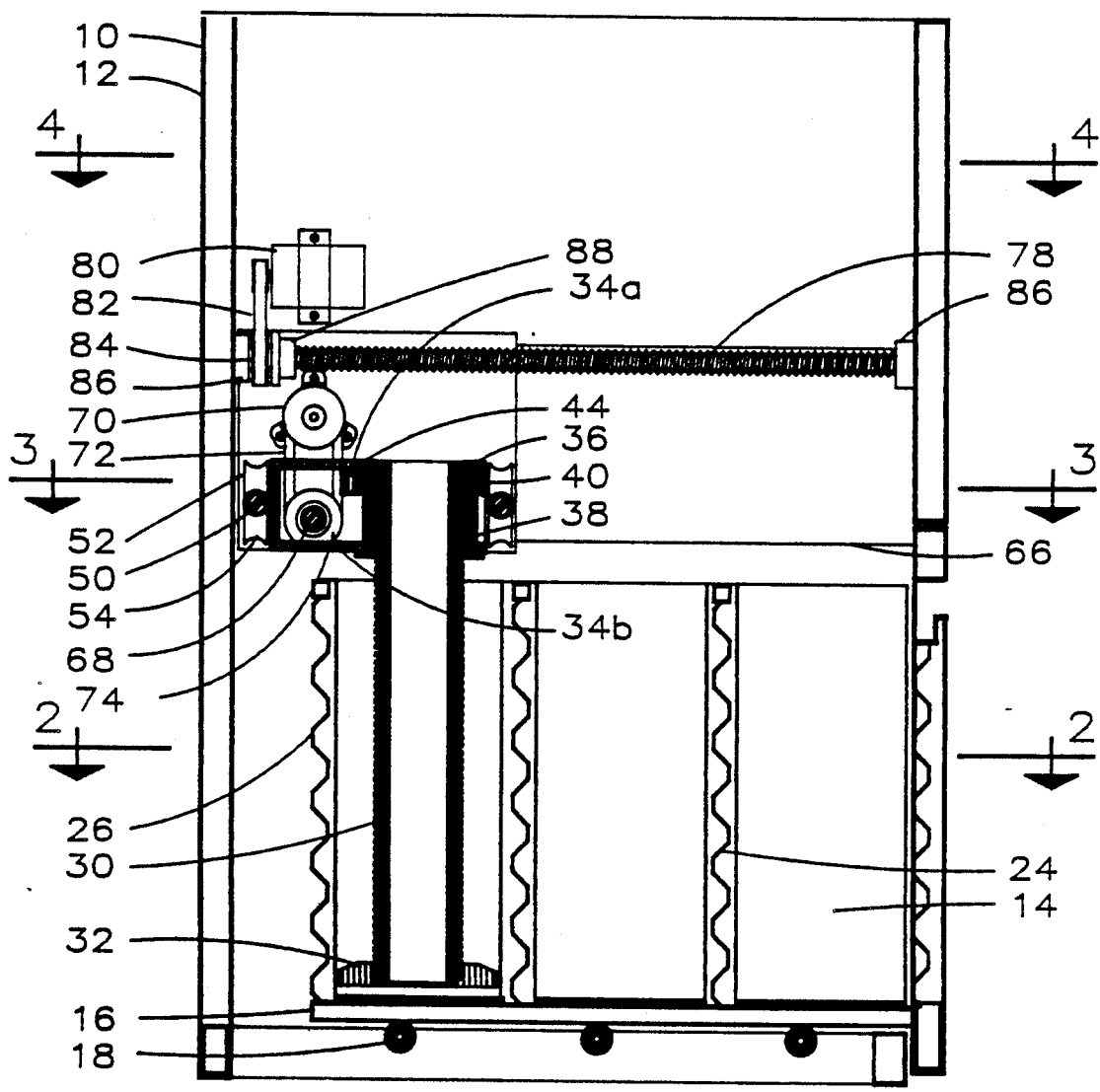
FIG. 7 is a side view in cross section of the solid waste compactor of FIG. 1, taken along section line 7—7 of FIG. 2.
Figure 8:
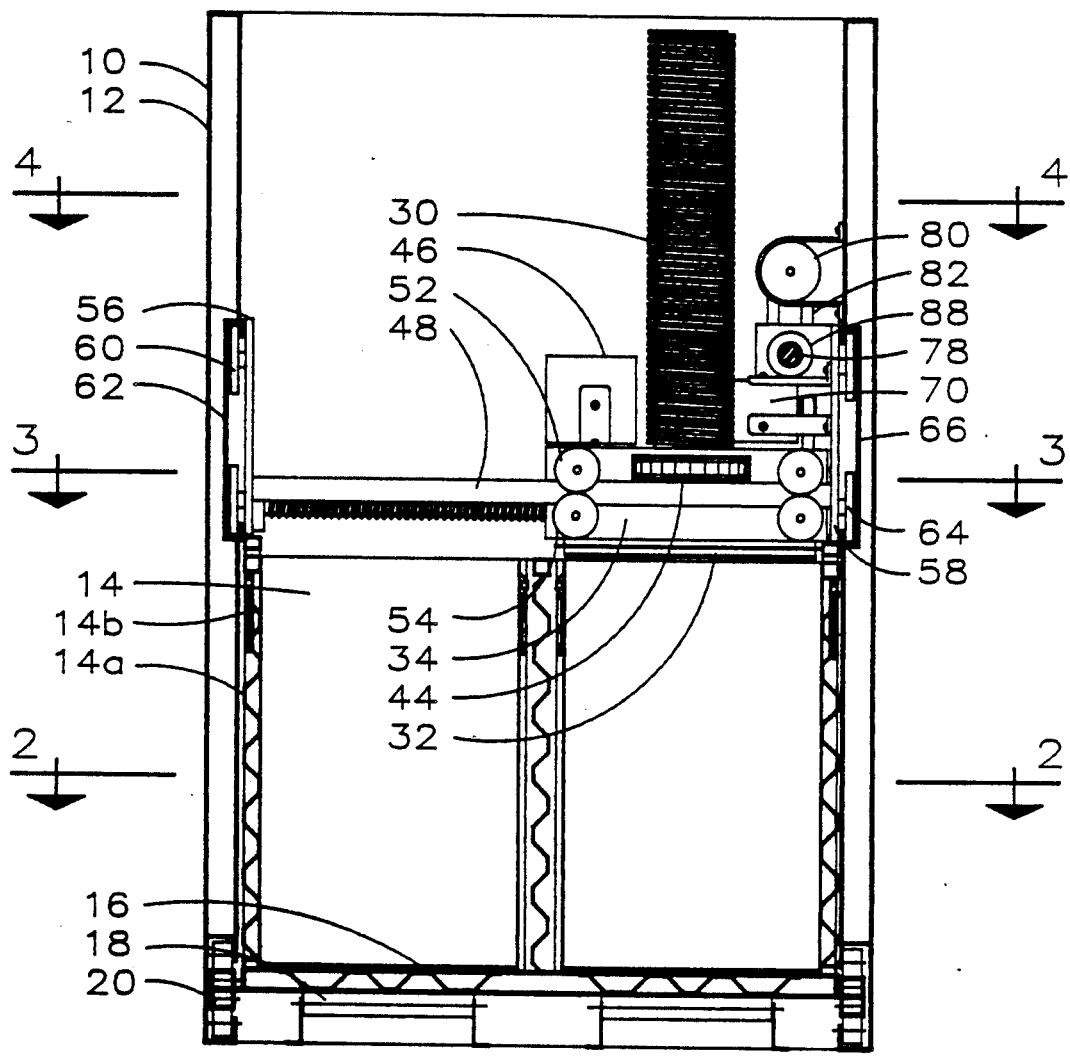
FIG. 8 is an end view in cross section of the solid waste compactor of FIG. 1, taken along section line 8—8 of FIG. 2.
Figure 9:
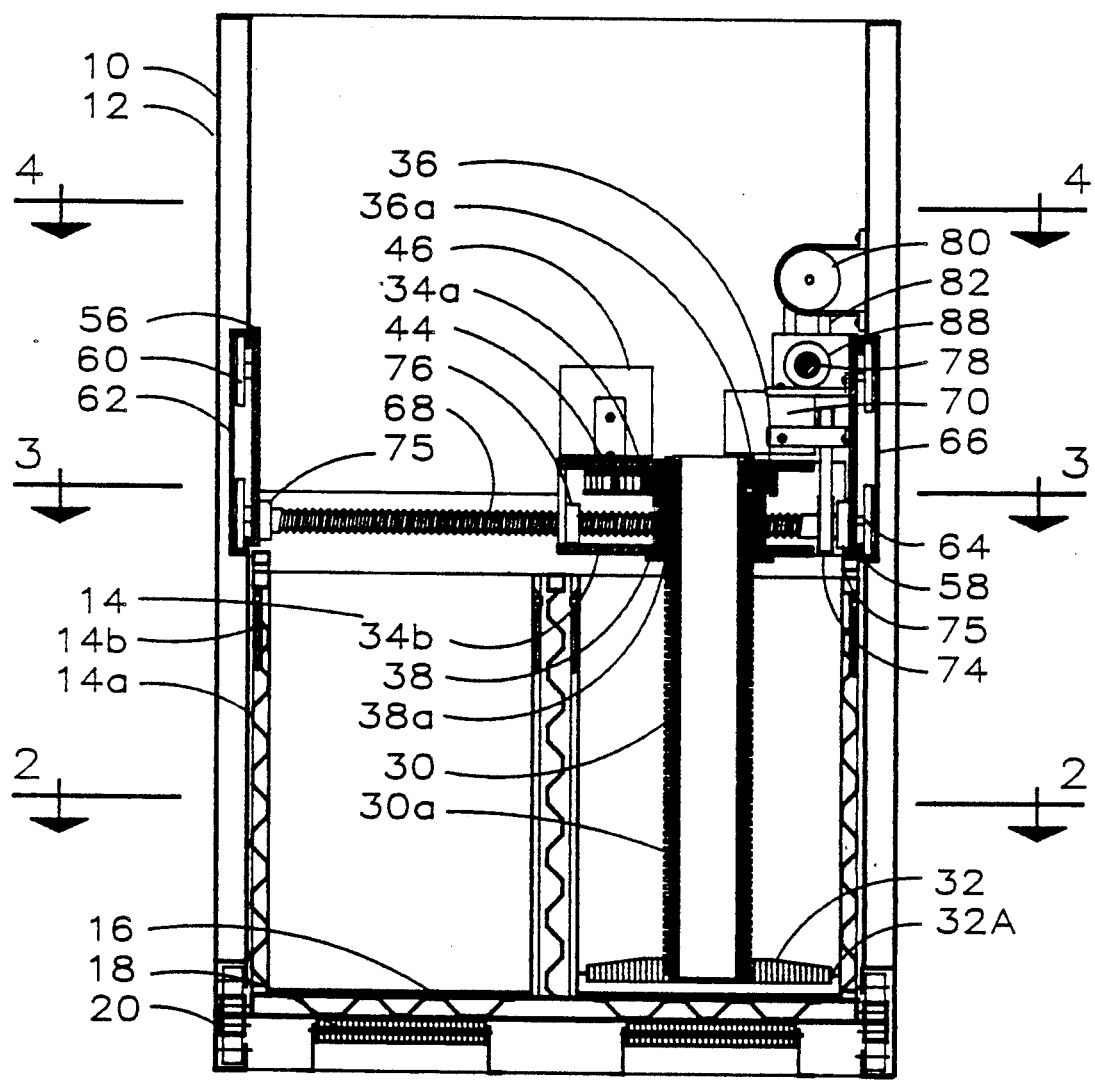
FIG. 9 is an end view in cross section of the solid waste compactor of FIG. 1, taken along section line 9—9 of FIG. 2.
Figure 10:
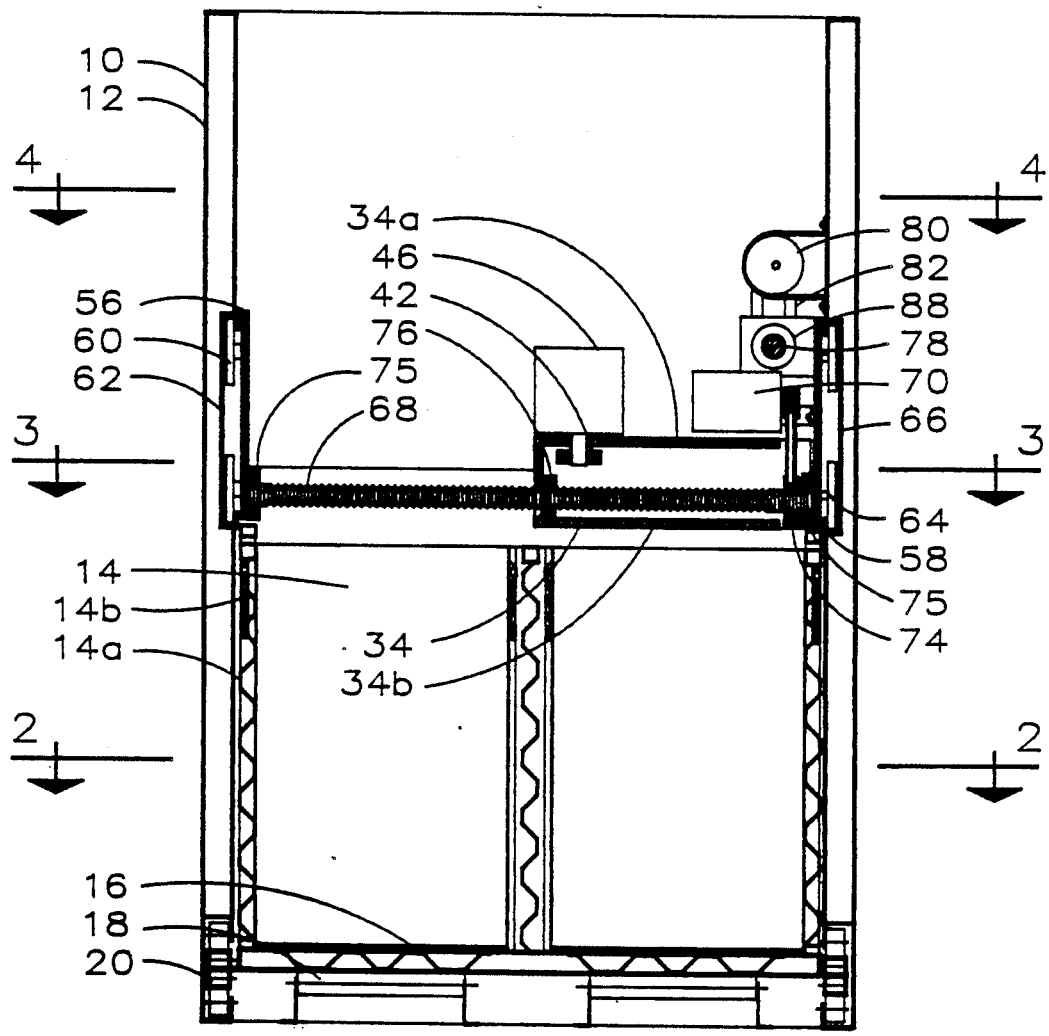
FIG. 10 is an end view in cross section of the solid waste compactor of FIG. 1, taken along section line 10—10 of FIG. 2.

The compaction screw trolley 34 includes an upper horizontal plate 34a and a lower horizontal plate 34b. The plates 34a and 34b include large diameter, centrally located and aligned holes, in which there are located an upper bushing 36 and a lower bushing 38, respectively (FIG. 7). The lower bushing 38 is relatively tall and extends upwards from the lower plate 34b. The compaction screw 30 passes through the bushings 36 and 38. The bushings 36 and 38 include integral keys 36a and 38a, respectively (FIG. 4). The keys 36a and 38a engage the keyways 30a of the compaction screw 30, to prevent it from rotating while allowing it to be raised and lowered through the bushings 36 and 38.

Between the upper and lower bushings 36 and 38 there is a chain sprocket 40 (FIGS. 3 and 7) which encircles the compaction screw 30. The chain sprocket 40 is snugly retained between the two bushings 36 and 38 so as to prevent vertical displacement of the sprocket 40. The chain sprocket 40 has an internally threaded hub which engages the external threads of the compaction screw 30. When the chain sprocket 40 is rotated, the compaction screw 30, which is prevented from rotating by the keys 36a and 38a, is driven upwardly or downwardly, depending on the direction of rotation of the chain sprocket 40.

The chain sprocket 40 is coupled to a drive sprocket 42 by means of a drive chain 44. The drive sprocket 42 is keyed to the end of a drive shaft of a compaction screw motor 46 which includes an internal gearbox. The motor 46 is mounted vertically on top of the upper plate 34a of the trolley. The drive shaft of the motor 46 extends downwardly through a hole in the upper plate 34a.

The trolley 34 rests on a pair of tubular trolley support bars 48 and 50. More specifically, the trolley 34 includes four upper rollers 52, two of which are journalled to each side of the trolley 34, and which rest on the bars 48 and 50. The trolley 34 also includes a second set of four lower rollers 54, two of which are also journalled to each side of the trolley 34, and which engage the lower sides of the bars 48 and 50. The upper and lower sets of rollers 52 and 54 are shaped and spaced apart so that they closely straddle the support bars 48 and 50 and thereby constrain the trolley 34 to travel along the bars 48 and 50 without undergoing any vertical displacement relative to the support bars 48 and 50. During compaction of waste the lower rollers 54 bear upwardly against the bars 48 and 50 and thereby prevent the trolley 34 from being raised upwardly during compaction.

The trolley support bars 48 and 50 span the width of the compactor housing 10. They extend between, and are affixed to, two vertically oriented mounting plates 56 and 58. Journalled to the outer surface of the mounting plate 56 is a set of four rollers 60 (FIG. 5), which are arranged in a rectangular array, and which are engaged in a trolley support track 62. Mounting plate 58 likewise includes four rollers 64 journalled to and extending from its outer surface, and which are engaged in a second trolley support track 66. The tracks 62 and 66 are affixed to the opposite sides of the compactor housing 10, and are in the nature of inwardly facing, horizontally extending, shallow channels. Each set of four rollers 60 and 64 is arranged in a rectangular array that is sized so as to fit closely within the confines of the upper and lower webs of the tracks 62 and 66, so as to bear the weight of the trolley 34 during travel of the trolley 34, and so as to also bear net upward forces imposed on the trolley 34 during compaction of waste.

The trolley 34 is moved back and forth on the trolley support bars 48 and 50 by means of an X-axis drive screw 68 and an associated X-axis indexing motor 70. The X-axis indexing motor 70 is mounted to the inside wall of the mounting plate 58, at a level just above the level of the trolley 34. The drive pulley of the motor 70 is connected to the X-axis drive screw 68 by a drive belt 72 and a drive screw pulley 74 which is keyed to the drive screw 68 (FIG. 7). The X-axis drive screw 68 is journalled at its opposite ends in bearings 75 which are mounted to the inside surfaces of the mounting plates 56 and 58. The trolley 34 includes a rotatable X-axis drive nut 76 which is engaged with the drive screw 68. The drive nut 76 is rotatably mounted in the end wall of the trolley 34 and is freely rotatable. Rotation of the drive screw 68 results in the trolley 34 being driven along the trolley support bars 48 and 50.

The trolley 34, support bars 48 and 50, and the mounting plates 58 and 60 are all driven as a unit in the Y-axis direction by means of a Y-axis drive screw 78 and an associated Y-axis indexing motor 80 (FIG. 11). The Y-axis motor 80 is mounted on the inside surface of one side wall of the housing 10, near the rear end of the housing 10. The drive motor 80 has a drive pulley which is connected by a drive belt 82 to a Y-axis drive screw pulley 84. The drive screw pulley 84 is keyed to the Y-axis drive screw 78. The ends of the drive screw 78 are journalled in end bearings 86 which are mounted on the opposite end walls of the housing 10.

The Y-axis drive screw 78 passes through a drive nut 88 which is rotatably journalled in an integral ear 58a that extends inwardly at a right angle from the top of the mounting plate 58. It will be seen that rotation of the Y-axis drive screw 78 results in the nut 88, the thus also the mounting plate 58, support bars 48 and 50 and trolley 34 all being driven in the Y-axis direction along the trolley support tracks 62 and 66.

In operation, the indexing motors 70 and 80 are employed to position the compaction screw 30 over one of the receptacles 14. The compaction screw motor 46 is then actuated to drive the screw 30 and its compaction plate 32 downwardly, compacting waste in the underlying receptacle 14. The compaction motor 46 includes a load sensing reversing switch which reverses the direction of the motor 46 and the screw 30 when the compaction load on the screw 30 has reached a predetermined level. When compaction is completed the compaction screw 30 is raised to a storage position above the receptacles. The compaction motor 46 and the indexing motors 70 and 80 may be controlled and actuated by means of a programmable microcontroller, which may be programmed to sequentially index the trolley 34 and compact waste in any or all of the receptacles 14 in an automatic compaction cycle.

The compactor of the present invention may include an upper enclosure panel of any desired type. Such a panel may be mounted on top of the compactor and serve simply to enclose the upper end. In this regard the compactor may be in the nature of modern kitchen cabinets and appliances, with the sizing and height of the compactor being intended to accommodate the standard heights and widths of kitchen counters, cutting boards and the like. Alternatively, the compactor may of course be provided with an independent upper enclosure surface of any desired type.

INDUSTRIAL APPLICABILITY

The present invention is of particular utility in the effective disposal or recycling of segregable classes of trash, refuse or other solid waste, including for example paper, clear glass, colored glass, aluminum cans and tin-coated steel cans.

The embodiments of the invention in which patent protection is claimed are as follows:

1. A solid waste compactor comprising a housing, a plurality of upwardly opening solid waste receptacles contained within said housing and arranged in a rectilinear array, compaction ram means operable to compact downwardly solid waste contained in said receptacles, said compaction ram means extending from a movable platform which is supported by and within said housing and which is selectively movable in orthogonal directions on first and second mutually orthogonal track means, and a compaction motor mounted on said platform and connected to said compaction ram means, said compaction motor being operable to selectively drive said compaction ram means downwardly into said receptacles and to raise said compaction means upwardly into a storage position.

2. The solid waste compactor defined in claim 1 wherein said platform comprises a wheeled trolley which travels on said first track means.

3. The solid waste compactor defined in claim 2 wherein said trolley travels on a first pair of tracks which span said housing in a first direction and which are affixed at their opposite ends to a pair of first and second mounting plates, said mounting plates traveling on a second pair of tracks which are affixed to said housing and which span said housing in a second direction that is orthogonal to said first direction, whereby said trolley is movable in first and second mutually orthogonal directions above said receptacles so as to be selectively positionable above each of said receptacles.

4. The solid waste compactor defined in claim 3 wherein said first pair of tracks comprises a pair of tubular support bars, and wherein said trolley includes two sets of upper rollers and two sets of lower rollers which engage the upper and lower sides respectively of said support bars, whereby said trolley travels upon said support bars and is also prevented from undergoing upward displacement relative to said support bars during compaction of waste in said receptacles.

5. The solid waste compactor defined in claim 4 wherein said first and second mounting plates each include upper and lower sets of rollers, and wherein said second pair of tracks comprises a pair of inwardly facing channels which enclose the upper and lower rollers of the respective mounting plate, whereby said trolley and said support bars and said mounting plates all travel along said channels and are prevented from upward displacement relative to said channels during compaction of waste in said receptacles.

6. The solid waste compactor defined in claim 5 further comprising first and second indexing motors for driving said trolley, said first indexing motor being mounted to one of said mounting plates, said first indexing motor being coupled to a first rotatable drive screw which spans said housing in said first direction and which passes through a rotatable nut journalled in said trolley, said first drive screw being journalled at its opposite ends in bearings mounted in said first and second mounting plates, whereby rotation of said first drive screw in one direction or the other by said first indexing motor causes said trolley to travel back and forth in first direction along said support bars.

7. The solid waste compactor defined in claim 6 wherein said second indexing motor is mounted on the inside of said housing and is coupled to a second rotatable drive screw which spans said housing in said second direction, said second drive screw being journalled at its opposite ends in bearings affixed to the opposite inside ends of said housing, and wherein said second drive screw passes through a rotatable nut journalled in one of said mounting plates, whereby rotation of said second drive screw in one direction or the other by said second indexing motor causes said mounting plates and said trolley to travel back and forth in said second direction along said second pair of tracks.

8. The solid waste compactor defined in claim 7 wherein said compaction ram means comprises an upright externally-threaded tubular compaction screw having a compaction plate affixed to its lower end, and said trolley having upper and lower plates having aligned openings in which a pair of upper and lower bushings, respectively, are located, said compaction screw passing through said bushings, said bushings having integral keys which are engaged in longitudinal keyways in said compaction screw to prevent rotation of said compaction screw relative to said trolley, and wherein said compaction motor is coupled to said compaction screw by a drive chain and an internally threaded chain sprocket which encircles said compaction screw between said upper and lower bushings.

9. The solid waste compactor defined in claim 2 wherein said compaction ram means comprises an upright externally-threaded tubular compaction screw having a compaction plate affixed to its lower end, and wherein said trolley includes upper and lower plates having aligned openings in which a pair of upper and lower bushings, respectively, are located, said compaction screw passing through said bushings, said bushings having integral keys which are engaged in longitudinal keyways in said compaction screw to prevent rotation of said compaction screw, and wherein said compaction motor is coupled to said compaction screw by a drive chain and an internally threaded chain sprocket which encircles said compaction screw between said upper and lower bushings.

10. The solid waste compactor defined in claim 9 wherein said compaction motor is mounted on said upper plate of said trolley and has a drive shaft which extends downwardly through an opening in said upper plate to a drive sprocket located between said upper and lower plates, said drive sprocket being connected by said drive chain to said chain sprocket.

11. The solid waste compactor defined in claim 10 wherein said compaction motor includes a load sensing reversing switch which operates to reverse the direction of said compaction screw during compaction of waste when a predetermined level of resistance is encountered.

12. The solid waste compactor defined in claim 9 wherein said compaction plate is sized and shaped to fit closely within said receptacles and wherein said compaction plate includes an elastomeric wiper blade extending transversely from its peripheral edges.

13. The solid waste compactor defined in claim 9 wherein said compaction screw is a large diameter, tubular, externally-threaded screw.

14. The solid waste compactor defined in claim 1 wherein said receptacles are removably mounted on a slidable carriage and wherein said housing includes an opening adjacent said carriage, whereby said carriage may be withdrawn through said opening in said housing to permit emptying of said receptacles.

15. The solid waste compactor defined in claim 14 wherein said compactor further includes a plurality of elongate bearing rollers mounted on the floor of said housing beneath said carriage, said bearing rollers operating particularly to support said carriage during compaction of waste in said receptacles.

16. The solid waste compactor defined in claim 15 wherein said compactor further includes a pair of cabinet slides on the opposite sides of said housing, said carriage being engaged in said cabinet slides to guide said carriage during withdrawal and reentry of said carriage.

17. The solid waste compactor defined in claim 16 wherein said carriage includes upright partitions for indexing said receptacles to predetermined locations on said carriage.

* * * * *